United States Patent
Oshino et al.

(10) Patent No.: US 11,869,683 B2
(45) Date of Patent: Jan. 9, 2024

(54) ELECTRIC WIRE OUTER COVER AND COVERED WIRE HARNESS

(71) Applicants: FURUKAWA ELECTRIC CO., LTD., Tokyo (JP); FURUKAWA AUTOMOTIVE SYSTEMS INC., Inukami-gun (JP)

(72) Inventors: Takashi Oshino, Tokyo (JP); Yoshikazu Kamei; Hiroshi Suyama, Tokyo (JP); Naoyuki Kojima, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 125 days.

(21) Appl. No.: 17/445,029

(22) Filed: Aug. 13, 2021

(65) Prior Publication Data
US 2021/0375503 A1    Dec. 2, 2021

Related U.S. Application Data

(63) Continuation of application No. PCT/JP2019/048040, filed on Dec. 9, 2019.

(30) Foreign Application Priority Data

Feb. 22, 2019   (JP) .................... 2019-030075

(51) Int. Cl.
*H02G 3/04*    (2006.01)
*H01B 7/17*    (2006.01)
*H01B 7/00*    (2006.01)

(52) U.S. Cl.
CPC ............. *H01B 7/17* (2013.01); *H01B 7/0045* (2013.01); *H02G 3/04* (2013.01)

(58) Field of Classification Search
CPC ...... B60R 6/0207; B60R 6/0215; H02G 3/04; H02G 3/0487; H02G 3/34; H01B 7/17; H01B 7/0045
See application file for complete search history.

(56) References Cited

U.S. PATENT DOCUMENTS 5,779,952 A * 7/1998 Matsumoto .......... H02G 3/0462
264/68
2004/0170891 A1 9/2004 Kajiya et al.
(Continued)

FOREIGN PATENT DOCUMENTS

CN         1539173 A     10/2004
CN       101663147 A      3/2010
(Continued)

OTHER PUBLICATIONS

International Search Report dated Jan. 7, 2020 in PCT/JP2019/048040 filed on Dec. 9, 2019, 1 page.
(Continued)

*Primary Examiner* — Paresh Paghadal
(74) *Attorney, Agent, or Firm* — Oblon, McClelland, Maier & Neustadt, L.L.P.

(57) ABSTRACT

An electric wire outer cover is provided which is to be fitted around an electric wire and which has a tubular housing portion where the electric wire is to be housed, the housing portion being formed of a sheet, the housing portion being formed in a folded state. Further, walls forming the housing portion include a first wall having a projection formed therefrom and a second wall having a hole formed therein, and the housing portion is formed by engagement between the first wall and the second wall through melting of the projection that has passed through the hole and welding of the melted projection to the second wall.

10 Claims, 5 Drawing Sheets

(56) References Cited

U.S. PATENT DOCUMENTS

| | | | |
|---|---|---|---|
| 2010/0109190 A1 | 5/2010 | Hanada | |
| 2013/0118778 A1* | 5/2013 | Takahashi | ........... B60R 16/0215 |
| | | | 174/154 |
| 2013/0146353 A1* | 6/2013 | Shimada | .............. H02G 3/0406 |
| | | | 174/72 A |

FOREIGN PATENT DOCUMENTS

| | | | | |
|---|---|---|---|---|
| CN | 101673647 A | | 3/2010 | |
| CN | 102354768 A | | 2/2012 | |
| CN | 204516873 U | | 7/2015 | |
| CN | 106848690 A | | 6/2017 | |
| JP | 2011138641 A | * | 7/2011 | ............... H02G 3/04 |
| JP | 2014027835 A | * | 2/2014 | ............... H02G 3/04 |
| JP | 2016-25763 A | | 2/2016 | |
| JP | 2017-055510 A | | 3/2017 | |
| JP | 2019-013107 A | | 1/2019 | |
| WO | WO-2015016056 A1 | * | 2/2015 | ........... H02G 3/0487 |

OTHER PUBLICATIONS

Combined Chinese Office Action and Search Report dated May 26, 2022, in Chinese Patent Application No. 201980091392.8 (with English translation), 13 pages.

Japanese Office Action dated May 23, 2023 in Japanese Patent Application No. 2021-501596 (with unedited computer-generated English Translation), 8 pages.

* cited by examiner

ELECTRIC WIRE OUTER COVER AND COVERED WIRE HARNESS

CROSS-REFERENCE TO RELATED APPLICATION(S)

This application is a continuation of International Application No. PCT/JP2019/048040, filed on Dec. 9, 2019 which claims the benefit of priority of the prior Japanese Patent Application No. 2019-030075, filed on Feb. 22, 2019, the entire contents of which are incorporated herein by reference.

BACKGROUND

The present disclosure relates to electric wire outer covers and covered wire harnesses.

BACKGROUND

Electric wire outer covers (protectors) fitted around electric wires to be arranged in vehicles have been proposed in the related art (for example, Japanese Laid-open Patent Publication No. 2017-055510). A protector described in Japanese Laid-open Patent Publication No. 2017-055510 has a tubular housing portion that houses an electric wire, to protect the electric wire from any external force, by having a plate folded to surround the electric wire and to have mutually overlapping portions engaged with each other by an engagement part.

In view of the above circumstances, an object of the present disclosure is to provide an electric wire outer cover and a covered wire harness that enable both reduced manufacturing cost and improved strength.

SUMMARY

According to an embodiment, there is provided an electric wire outer cover according to the present disclosure to be fitted around an electric wire and having a tubular housing portion where the electric wire is to be housed, the housing portion being formed of a sheet, the housing portion being formed in a folded state. Further, walls forming the housing portion include a first wall having a projection formed therefrom and a second wall having a hole formed therein, and the housing portion is formed by engagement between the first wall and the second wall through melting of the projection that has passed through the hole and welding of the melted projection to the second wall.

DETAILED DESCRIPTION

In the related art, because the engagement part engaging the mutually overlapping portions of the plate in the protector to each other is a part separately bodied from the plate and the mutually overlapping portions need to be engaged to each other at more than one point along the direction in which the electric wire extends, the thus increased number of parts increases the manufacturing cost.

Preferred embodiments of an electric wire outer cover and a covered wire harness according to the present disclosure will be described in detail below by reference to the appended drawings.

Figure 1:
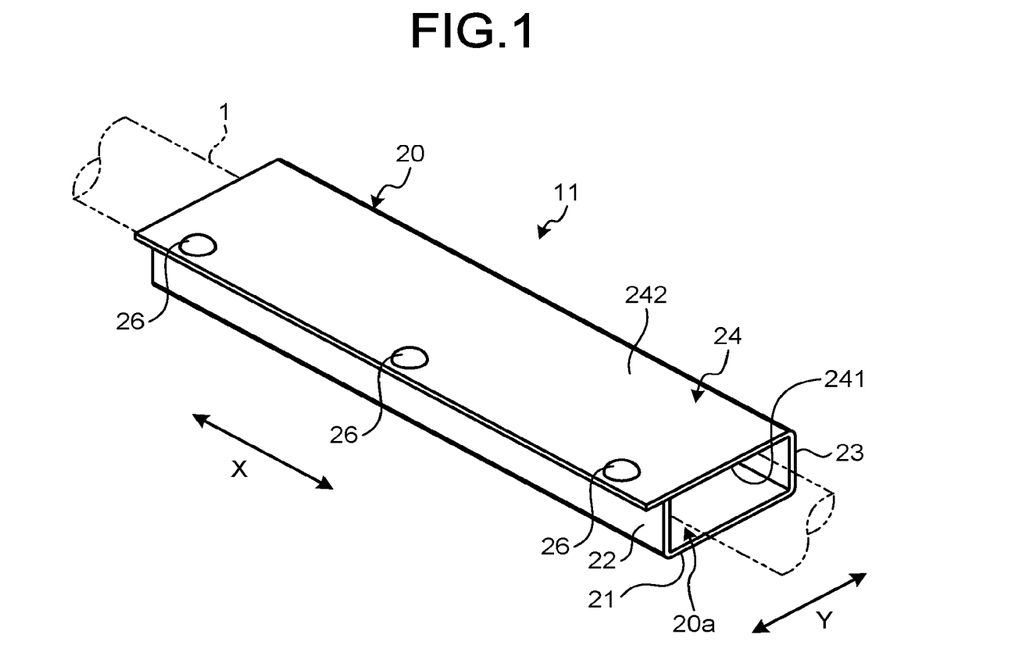
FIG. 1 is a perspective view of a covered wire harness using an electric wire outer cover that is an embodiment of the present disclosure, that is, a covered wire harness that is an embodiment of the present disclosure.
Figure 2:
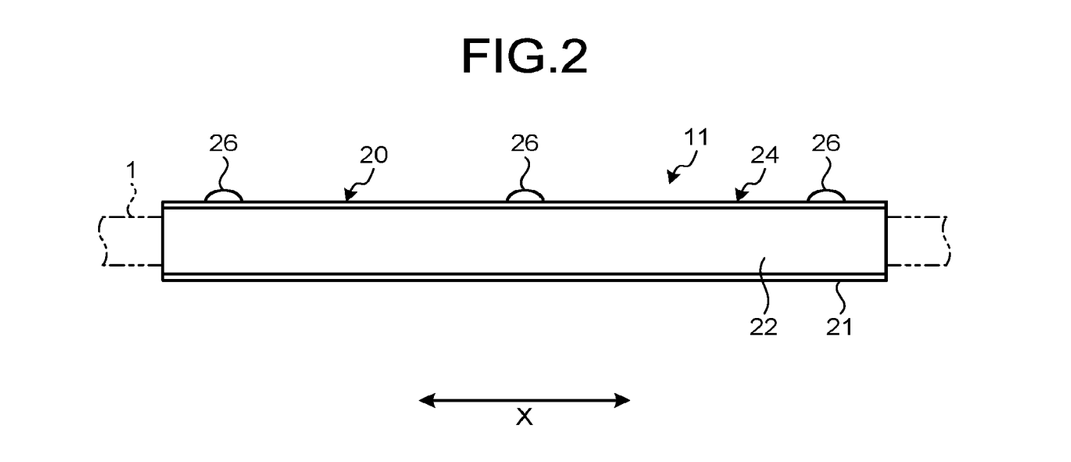
FIG. 2 is a front view of the covered wire harness using the electric wire outer cover that is the embodiment of the present disclosure, that is, the covered wire harness that is the embodiment of the present disclosure.

FIG. 1 and FIG. 2 each illustrate a covered wire harness using an electric wire outer cover that is an embodiment of the present disclosure, that is, a covered wire harness that is an embodiment of the present disclosure, FIG. 1 is a perspective view thereof, and FIG. 2 is a front view thereof.

A configuration of the electric wire outer cover will be described in detail below, and the electric wire outer cover is fitted around an electric wire with the electric wire being housed in a tubular housing portion of the electric wire outer cover, the tubular housing portion being formed of a sheet and formed in a folded state.

A covered wire harness 11 described as an example herein is configured to include a wire harness 1 and an outer cover (an electric wire outer cover) 20. The wire harness 1 is a known one in the related art and formed of a bundle of plural electric wires.

The outer cover 20 is a long member formed of a single sheet bent to form a housing portion 20a that is quadrangularly tubular. A longitudinal direction of the outer cover 20 will be described as an X-direction and a direction orthogonal to this longitudinal direction will be described as a Y-direction herein.

Figure 3:
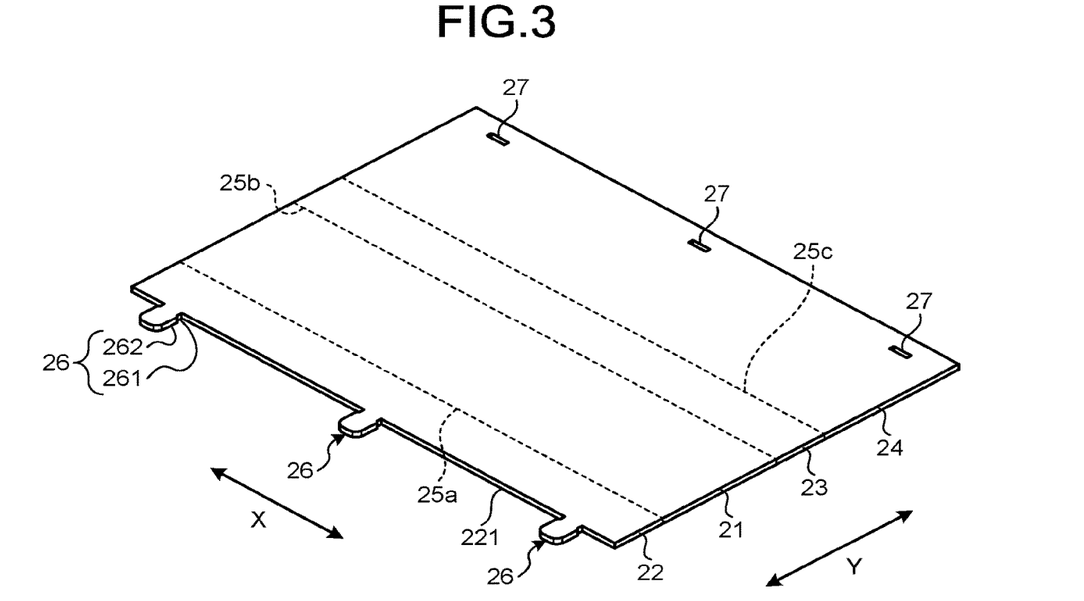
FIG. 3 is a perspective view of the outer cover illustrated in FIG. 1 and FIG. 2, the outer cover being in an unfolded state.
Figure 4:
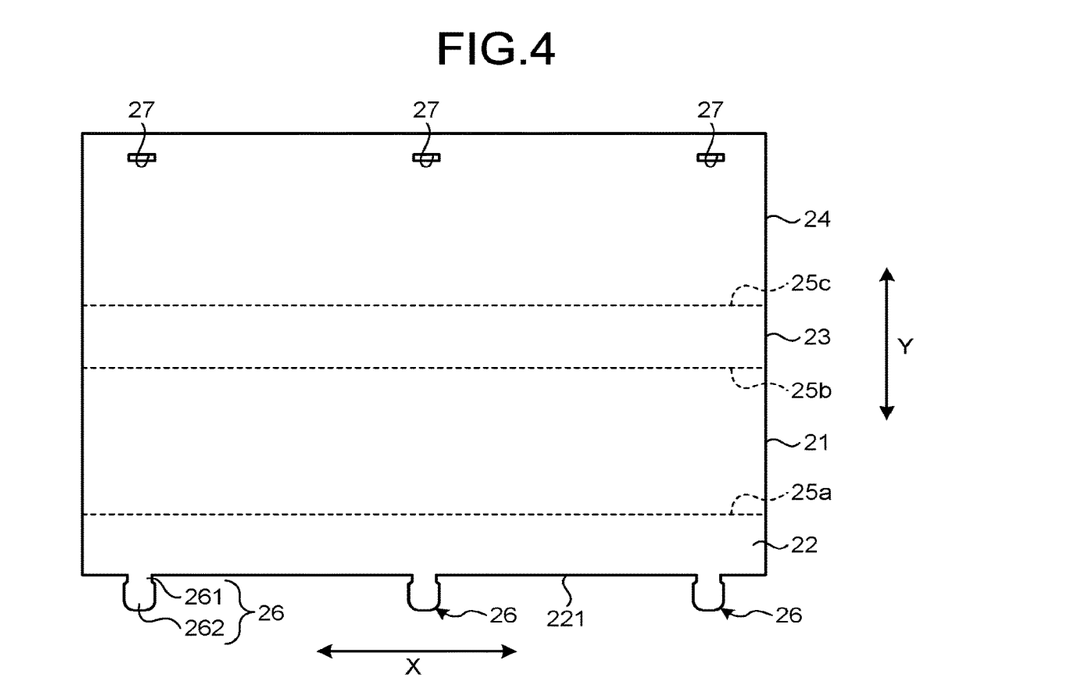
FIG. 4 is a plan view of the outer cover illustrated in FIG. 1 and FIG. 2, the outer cover being in the unfolded state.

Walls forming the housing portion 20a include, as illustrated in FIG. 1: a first side wall 22 that is a first wall having projections 26 formed therein; and an upper wall 24 that is a second wall having holes 27 formed therein (see FIG. 3 and FIG. 4). The housing portion 20a is formed by engagement between the first side wall 22 and the upper wall 24 through melting of the projections 26 that have passed through the holes 27 and welding of the melted projections 26 onto the upper wall 24.

This welding refers to plastic welding. With respect to the embodiments, a case where ultrasonic welding is adopted as an example of the plastic welding will be described, but the plastic welding may be vibration welding, radio frequency welding, hot plate welding, or laser welding, without being limited to the ultrasonic welding. The plastic welding refers to a technique for bonding thermoplastic resin parts together at the molecular level by heating the thermoplastic resin parts up to a temperature exceeding their melting points and applying pressure thereto. The ultrasonic welding refers to a technique for bonding resin members together by melting the resin members through ultrasonic vibration and application of pressure. The vibration welding refers to a technique for bonding parts together by generating frictional heat at a boundary between the parts through application of pressure and vibration to melt the parts. The radio frequency welding is a technique for bonding by causing collision, vibration, and friction at the molecular level inside the substances to cause melting by that self-heating, through application of radio frequency. The hot plate welding refers to a technique for bonding resin by melting the resin using a hot plate that has been heated and applying pressure to the resin until the resin cools and solidifies. The laser welding refers to a technique for bonding parts by generating heat at a boundary between the parts through irradiation of the parts with laser light to melt the resin.

Specifically, the housing portion 20a is configured to be enclosed by plural walls that are a bottom wall 21, the first side wall (the first wall) 22, a second side wall 23, and the upper wall (the second wall) 24.

The bottom wall 21 forms the bottom surface of the housing portion 20a and forms the undersurface of the outer cover 20. The first side wall 22 is connected with the bottom wall 21 with a first fold 25a between the first side wall 22 and the bottom wall 21, as also illustrated in FIG. 3 and FIG. 4. The second side wall 23 is connected with the bottom wall 21 with a second fold 25b between the second side wall 23 and the bottom wall 21. The dimension of this second side wall 23 along the Y-direction in FIG. 3 and FIG. 4 is equivalent to the dimension of the first side wall 22 along the Y-direction. The upper wall 24 is connected with the second side wall 23 with a third fold 25c between the upper wall 24 and the second side wall 23. The dimension of this upper wall 24 along the Y-direction in FIG. 3 and FIG. 4 is larger than the dimension of the bottom wall 21 along the Y-direction.

Among these walls, the first side wall 22 forms one end portion of the sheet and the upper wall 24 forms the other end portion of the sheet, the one end portion and the other end portion being at ends of the length of the sheet, the length being along the Y-direction.

Plural (three in the example illustrated in FIG. 2) projections 26 projecting outward (along the Y-direction in FIG. 3 and FIG. 4) are formed at predetermined intervals along the X-direction along an edge of the first side wall 22. These projections 26 are formed to be coplanar with the first side wall 22 and to project outward from an end face 221 of the first side wall 22.

The projections 26 each has a body 261 and a head 262. The body 261 is a portion extending outward from the first side wall 22 and forms a proximal end portion of the projection 26. The head 262 is a portion connected with an extended end portion of the body 261 and forms a distal end portion of the projection 26. The head 262 of the projection 26 is formed to be slightly wider than the body 261 of the projection 26. In more detail, a width dimension (the dimension along the X-direction) of the body 261 is formed to be slightly larger than a width dimension (the dimension along the X-direction) of the head 262.

Plural (three in the example illustrated in FIG. 2) holes 27 are formed in an end portion of the upper wall 24, at predetermined intervals along the X-direction correspondingly to the projections 26. These holes 27 each form a rectangular shape having its longitudinal direction along the X-direction.

How the wire harness 1 is housed in the housing portion 20a will be described below. The sheet is folded along the first fold 25a and second fold 25b so that the first side wall 22 and second side wall 23 become approximately perpendicular to the bottom wall 21. Furthermore, the sheet is folded along the third fold 25c so that the upper wall 24 becomes approximately perpendicular to the second side wall 23. The bottom wall 21 and the upper wall 24 are thereby opposed to each other and the first side wall 22 and the second side wall 23 are thereby opposed to each other. The wire harness 1 is then placed to extend along the X-direction between the bottom wall 21 and the upper wall 24.

Figure 5:
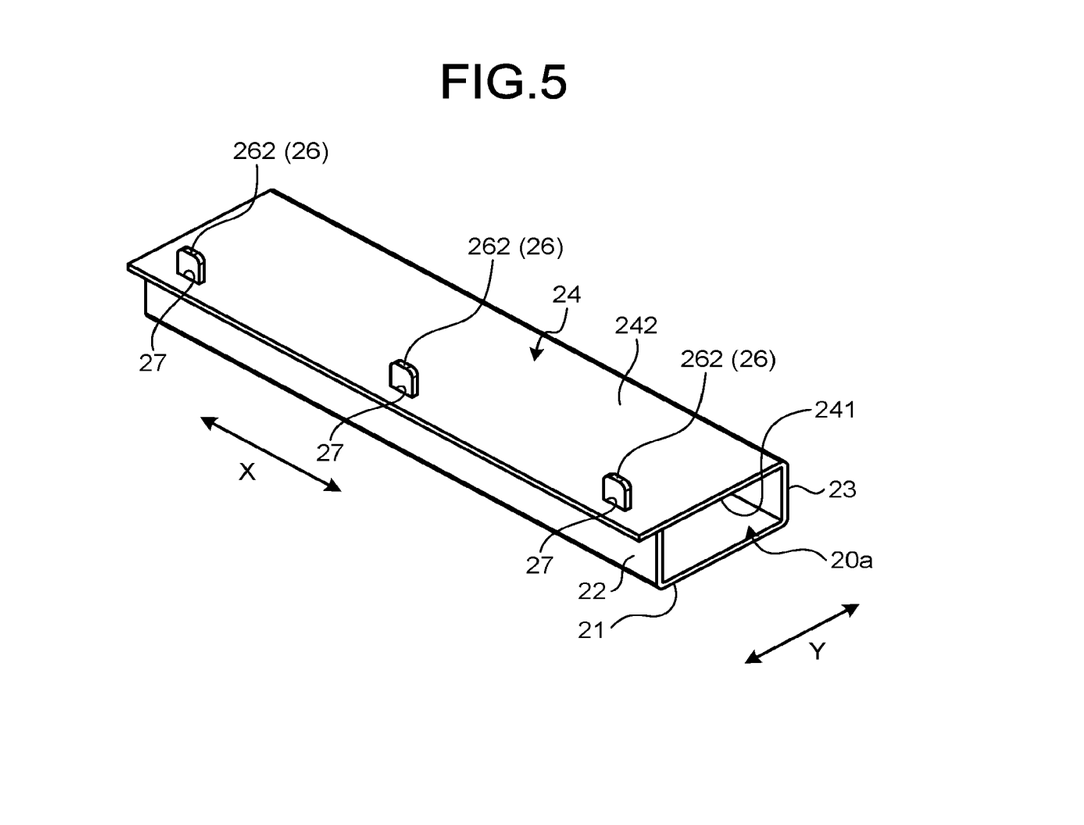
FIG. 5 is a perspective view illustrating a state where projections have been inserted through holes illustrated in FIG. 3 and FIG. 4.
Figure 6:
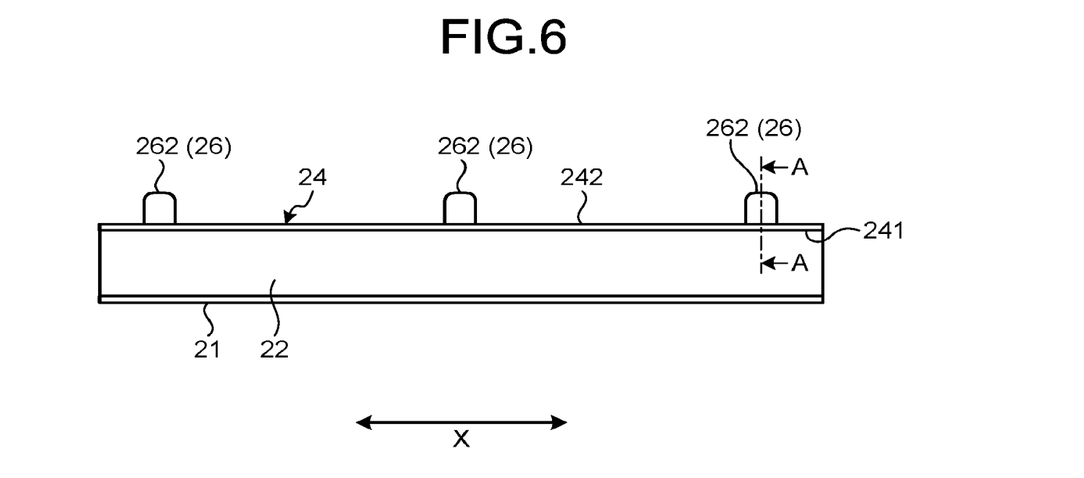
FIG. 6 is a front view illustrating a state where the projections have been inserted through the holes illustrated in FIG. 3 and FIG. 4.

Thereafter, the projections 26 are inserted through the holes 27. In more detail, as illustrated in FIG. 5 and FIG. 6, the projections 26 are inserted through the holes 27 in the order of the heads 262 and the bodies 261. When this is done, the end face 221 of the first side wall 22 preferably comes into contact with a lower surface 241 that has become an inner surface of the upper wall 24.

Figure 7:
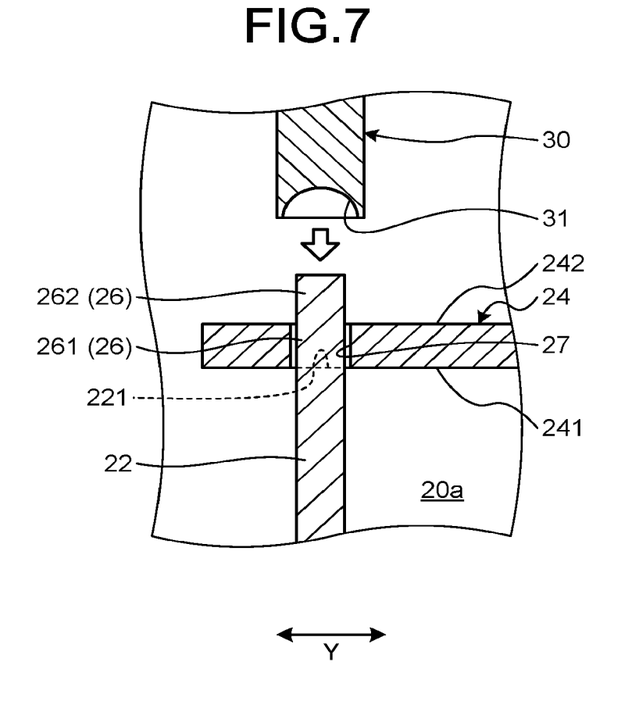
FIG. 7 is a sectional view illustrating how a projection that has passed through a hole is welded to an upper wall, the sectional view being that for a section along a line A-A in FIG. 6.
Figure 8:
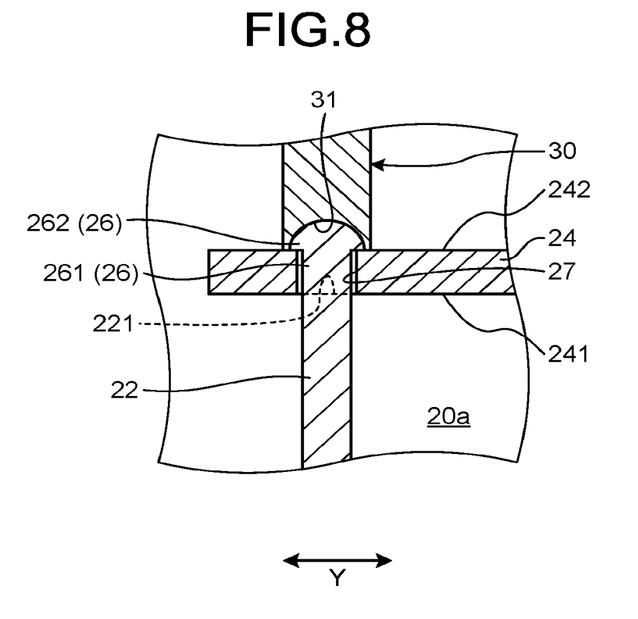
FIG. 8 is a sectional view illustrating how the projection that has passed through the hole is welded to the upper wall, the sectional view being that for a section along the line A-A in FIG. 6.
Figure 9:
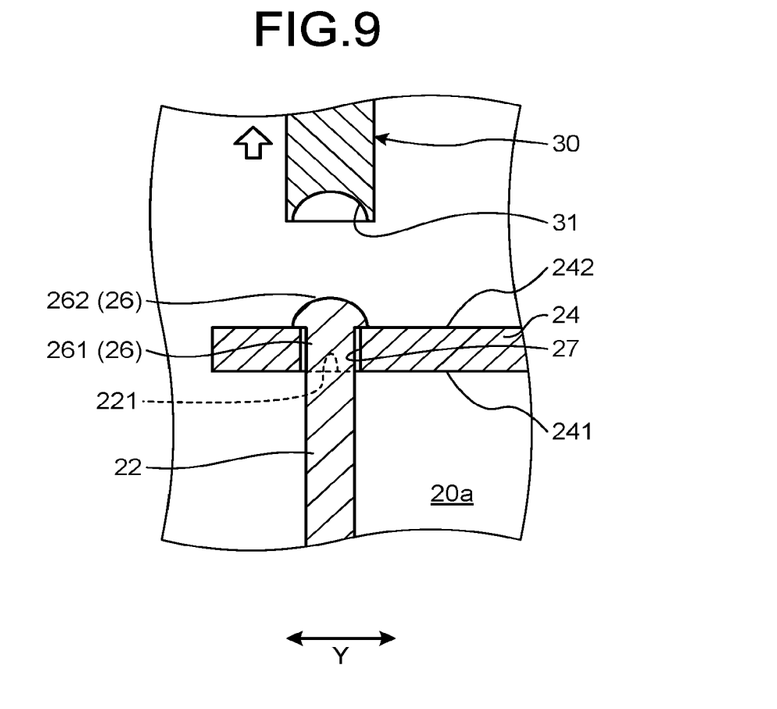
FIG. 9 is a sectional view illustrating how the projection that has passed through the hole is welded to the upper wall, the sectional view being that for a section along the line A-A in FIG. 6.

As illustrated in FIG. 7, an ultrasonic welder 30 having a concave 31 formed at a distal end portion of the ultrasonic welder 30, the concave 31 being semispherical, is then brought closer to the projection 26 (the head 262) that has passed through the hole 27. Thereafter, as illustrated in FIG. 8, the distal end portion of the ultrasonic welder 30 is brought into contact with the projection 26 projecting upward from the upper wall 24, and after ultrasound is emitted for 6 seconds to 8 seconds, for example, cooling takes place for 7 seconds to 9 seconds, for example, and as illustrated in FIG. 9, the ultrasonic welder 30 is separated. As a result, the projection 26 that has passed through the hole 27 is welded to a rim portion of the opening of the hole 27 on an upper surface 242 that is an outer surface of the upper wall 24 by melting of the projection 26 into a semispherical shape, the first side wall 22 and the upper wall 24 are thereby engaged with each other, the wire harness 1 is housed in the housing portion 20a, and the outer cover 20 is fitted around the wire harness 1.

Any of various sheets may be used as the sheet forming the outer cover 20, but the sheet is preferably a thermoplastic resin foam sheet. The type of resin for the thermoplastic resin foam sheet is not particularly limited and may be any thermoplastic resin, such as, for example, a polyethylene resin, a polypropylene resin, a polycarbonate resin, a polyethylene terephthalate resin, a polybutylene terephthalate resin, a polyamide resin, a polyphenylene sulfide resin, a polystyrene resin, a polyvinyl chloride resin, a polyvinyl acetate resin, a polytetrafluoroethylene resin, or an acrylic resin.

The density of the thermoplastic resin foam sheet is not particularly limited, but to prevent its mechanical properties from becoming anisotropic and thereby improve the design freedom for the outer cover 20, for example, the density is preferably 200 kg/m$^3$ or higher and 1000 kg/m$^3$ or lower, and to improve the balance between weight reduction and mechanical strength further, the density is more preferably 300 kg/m$^3$ or higher and 600 kg/m$^3$ or lower, and particularly preferably 350 kg/m$^3$ or higher and 550 kg/m$^3$ or lower.

The thermoplastic resin foam sheet may have non-foam layers or a non-foam layer on both sides or one side of the thermoplastic resin foam sheet. That is, the thermoplastic resin foam sheet may be configured to have a foam layer and a non-foam layer formed on the foam layer. By the formation of the non-foam layer on a surface of the thermoplastic resin foam sheet, the bending elasticity of the outer cover 20 is improved and the protection performance for the wire harness 1 housed in the housing portion 20*a* is improved further. To improve the bending elasticity of the outer cover 20 further, a three-layer structure having non-foam layers on both sides of the thermoplastic resin foam sheet is preferable. The thickness of the non-foam layer/layers formed on the thermoplastic resin foam sheet is/are not particularly limited, but is preferably 10 μm or thicker and 100 μm or thinner, for example.

The bubble number density of the foam layer in the thermoplastic resin foam sheet is not particularly limited, but to more infallibly prevent the mechanical properties from becoming anisotropic, for example, the lower limit of the bubble number density is preferably 800 bubbles/mm$^3$ or more and particularly preferably 1000 bubbles/mm$^3$ or more. The upper limit of the bubble number density on the other hand is preferably, for example, $10^{10}$ bubbles/mm$^3$ to obtain excellent mechanical strength.

The thickness of the sheet that is the thermoplastic resin foam sheet is not particularly limited, but to improve the balance between the ease of folding and the mechanical strength further, the thickness is, for example, preferably 0.80 mm or thicker and 5.0 mm or thinner and particularly preferably 1.0 mm or thicker and 2.5 mm or thinner.

As described above, the strength of the outer cover 20 and the covered wire harness 11 that are embodiments of the present disclosure is improved because the tubular housing portion 20*a* is formed by engagement between the first side wall 22 and the upper wall 24 through melting of the projections 26 of the first side wall 22 that have been passed through the holes 27 of the upper wall 24 and welding of the melted projections 26 to the upper wall 24, and the first side wall 22 and the upper wall 24 are thereby able to be engaged with each other sufficiently strongly. Furthermore, the number of parts in the outer cover 20 and the covered wire harness 11 is able to be reduced without using additional parts (engagement parts) as used in the related art, because the projections 26 and the holes 27 are formed in the first side wall 22 and the upper wall 24. Therefore, the outer cover 20 and the covered wire harness 11 enable both reduced manufacturing cost and improved strength.

What is more, the outer cover 20 and the covered wire harness 11 enable the state of engagement between the first side wall 22 and the upper wall 24 to be sufficiently strong, and there is thus no possibility that the housing portion 20*a* will be deformed and damaged due to vibration upon installation in a vehicle, for example. In particular, the housing portion 20*a* is able to be formed satisfactorily even with a thermoplastic resin foam sheet having a light weight and reduced strength, and this is beneficial.

Because the projections 26 formed to be coplanar with the first side wall 22 and to project outward from the end face 221 are inserted through the holes 27, melted, and welded to the outer surface of the upper wall 24, the first side wall 22 and the upper wall 24 are engaged with each other outside the housing portion 20*a* of the outer cover 20 and the covered wire harness 11. That is, melting of the projections 26, for example, does not affect the housing portion 20*a*. Therefore, there is no possibility that the wire harness 11 housed in the housing portion 20*a* will be damaged, for example.

In the above described outer cover 20 and the covered wire harness 11, because the sheet forming the outer cover 20 is a thermoplastic resin foam sheet, when the projections 26 are welded to the upper wall 24 by ultrasonic welding, the projections 26 are melted comparatively early and the engagement between the first side wall 22 and the upper wall 24 is thereby able to be achieved in a short period of time.

Preferred embodiments of the present disclosure have been described above, but the present disclosure is not limited to these embodiments and various modifications may be made.

In the above described embodiments, the projections 26 are coplanar with the first side wall 22, but according to the present disclosure, projections may be not coplanar with a first wall and may be not projecting from an end face of the first wall.

INDUSTRIAL APPLICABILITY

As described above, an electric wire outer cover and a covered wire harness according to the present disclosure are useful for housing electric wires to be arranged in vehicles, for example.

According to an embodiment, it is possible to both reduce the manufacturing cost and improve the strength. Further, it is possible to improve the reliability by fixing through melting.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An electric wire outer cover to be fitted around an electric wire, comprising:
    a tubular housing portion where the electric wire is to be housed, the housing portion being formed of a sheet including a projection provided on a first end of the sheet and a hole extending through the sheet at a second end of the sheet which is opposite to the first end, the sheet being formed in a folded state to provide walls forming the housing portion which include a first wall having the projection formed therefrom and a second wall having the hole formed therein, and the housing portion is formed by engagement between the first wall and the second wall by passing a portion of the projection through the hole to form the tubular housing portion having an internal surface and an external surface with the projection extending from the external surface; and
    a weld connection formed by melting of the projection that has passed through the hole such that the melted projection is larger than the hole and welded to the exterior surface of the second wall.

2. The electric wire outer cover according to claim 1, wherein the projection comprises:
    a body portion formed to be coplanar with the first wall and to project outward from an end face of the first wall; and
    a head portion that has passed through the hole, been melted, and been welded to the exterior surface of the second wall.

3. The electric wire outer cover according to claim 2, wherein the projection has been welded to the exterior surface of the second wall by plastic welding.

4. The electric wire outer cover according to claim 1, wherein the sheet is a thermoplastic resin foam sheet.

5. A covered wire harness, comprising:
    the electric wire outer cover according to claim 1; and a wire harness comprising the electric wire, wherein the electric wire outer cover has been fitted around a wire harness housed in the housing portion.

6. The electric wire outer cover of claim 4, wherein the thermoplastic resin foam sheet comprises a foam layer having a density of 200 kg/m3 or higher and 1000 kg/m3 or lower.

7. The electric wire outer cover of claim 6, wherein the foam layer has a density of 300 kg/m3 or higher and 600 kg/m3 or lower.

8. The electric wire outer cover of claim 7, wherein the foam layer has a density of 350 kg/m3 or higher and 550 kg/m3 or lower.

9. The electric wire outer cover of claim 4, wherein the thermoplastic resin foam sheet comprises at least one non-foam layer.

10. The electric wire outer cover of claim 4, wherein the thermoplastic resin foam sheet comprises a first non-foam layer provided on a first side of the foam layer, and a second non-foam layer provided on a second side of the foam layer such that the foam layer is sandwiched between the first and second non-foam layers.

\* \* \* \* \*